United States Patent [19]

Jack

[11] Patent Number: 4,962,316
[45] Date of Patent: Oct. 9, 1990

[54] FREQUENCY DOMAIN INTEGRATING RESONANT SUPERCONDUCTING TRANSMISSION LINE DETECTOR

[75] Inventor: Michael D. Jack, Goleta, Calif.

[73] Assignee: Santa Barbara Research Center, Goleta, Calif.

[21] Appl. No.: 387,209

[22] Filed: Jul. 31, 1989

[51] Int. Cl.$^5$ .......................................... H01L 39/00
[52] U.S. Cl. ................................. 250/336.2; 505/849; 505/866
[58] Field of Search ..................... 250/336.2; 505/848, 505/849, 866

[56] References Cited

U.S. PATENT DOCUMENTS 4,873,482 10/1989 Gray ................................. 250/336.2

OTHER PUBLICATIONS

"Superconducting Kinetic Inductance Bolometer," by J. E. Sauvageau and D. G. McDonald; presented at Applied Superconductivity Conference, Sep. 1988.

Primary Examiner—Carolyn E. Fields
Attorney, Agent, or Firm—W. C. Schubert; W. K. Denson-Low

[57] ABSTRACT

A Frequency Domain Infrared Superconducting Transmission Line (FIRST) detector is comprised of a folded superconducting transmission line 18 coupled at an input port 18a to a narrow band microwave source and coupled at an output port 18b to a microwave power monitor 22. An optically induced change in the kinetic inductance of the transmission line shifts the transmission line phase velocity and resonant frequency. The shift in resonant frequency attenuates the propagating wave amplitude proportionally to the product of the transmission line Q and the frequency shift. When fabricated with a densely folded superconducting line and operated at a nominal resonant frequency of several GHz the use of either linear or logarithmic Schottky barrier detectors enables a realization of a dynamic range of eight orders of magnitude.

24 Claims, 4 Drawing Sheets

FREQUENCY DOMAIN INTEGRATING RESONANT SUPERCONDUCTING TRANSMISSION LINE DETECTOR

FIELD OF THE INVENTION

This invention relates generally to radiation detectors and, in particular, to a Frequency domain Integrating Resonant Superconducting Transmission line (FIRST) detector.

BACKGROUND OF THE INVENTION

Conventional semiconductor detectors of IR radiation typically require a significant volume of material to achieve a high quantum efficiency. This significant volume, while enhancing sensitivity to incident radiation, also serves to render the detector susceptible to optical attack and electromagnetic interference. Also, in semiconductor detectors, signal levels are detected as a change in a number of charge carriers excited across a gap characteristic of the semiconductor crystal lattice. This excitation results in a change in current or voltage across the detector. However, noise associated with a bias current (shot noise), reset voltage (thermal noise), or semiconductor defect distribution (1/f noise) limits the minimum signal levels that can be detected. High Temperature Superconducting (HTS) detectors typically require voltage bias, weak link structures and low level voltage amplification for proper operation.

HTS devices are generally comprised of a ceramic material that is inherently substantially immune to catastrophic damage by direct optical attack. For example, while operated in an oxygen atmosphere ceramic superconductors have been found to survive for significant periods of time at temperatures of 500–1000 C. Such ceramic superconducting detectors thus inherently provide for optical hardening. However superconducting detectors, due to weak link structures, have been found to be susceptible to magnetic flux interference at levels of a few gauss and also to electromagnetic interference which has been shown to cause steps in the I-V characteristics.

It is therefore one object of the invention to provide a HTS IR radiation detector that overcomes the problems associated with conventional semiconductor and HTS detectors while providing improved immunity to hostile nuclear and optical radiation, electromagnetic interference and high temperature environments.

It is another object of the invention to provide a HTS radiation detector that provides other advantages over conventional semiconductor and HTS detectors including an increased manufacturing yield, a larger size array, a reliable interface to readout electronics, a high sensitivity at longer wavelengths and a larger dynamic range.

SUMMARY OF THE INVENTION

The foregoing problems are overcome and other advantages are realized by a detector structure that employs superconducting resonant structures, primarily transmission lines, as highly sensitive IR detectors. No bias is required to be applied during signal integration. The detectors are read out as a shift in a resonant frequency of the transmission line structure.

The FIRST detector of the invention fulfills the objects set forth above in that the detectors are fabricated as superconducting thin films integratable at VLSI levels with semiconducting diode amplifiers. No bias is required during signal integration thereby ensuring low noise levels. Also, an inherently high Q achievable with superconducting resonant structures provides excellent responsivity to incident radiation. FIRST detectors are constructed with a small radiation absorbing volume, relative to semiconductive detectors, while exhibiting a minimal sensitivity to high levels of material impurities. An inherent capability to withstand large critical currents and high decomposition temperatures provides both electromagnetic and optical hardness. The FIRST detector of the invention furthermore exhibits a small and adjustable superconducting energy gap which extends the optical cutoff wavelength. A minimal nonoptically active volume also results in a decrease in dark current with a corresponding extension of the upper operating temperature range. The FIRST detector is comprised of a folded superconducting transmission line coupled at an input port to a narrow band microwave source and coupled at an output port to a microwave power monitor. An optically induced change in the kinetic inductance of the transmission line shifts the transmission line phase velocity and resonant frequency. This shift in resonant frequency attenuates the propagating wave amplitude proportionally to the product of the Q and the frequency shift. In that the FIRST detector is fabricated with a densely folded transmission line and operated at a nominal resonant frequency of several GHz the use of linear and/or logarithmic Schottky barrier detectors enables a realization of an optical detection dynamic range of eight orders of magnitude.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
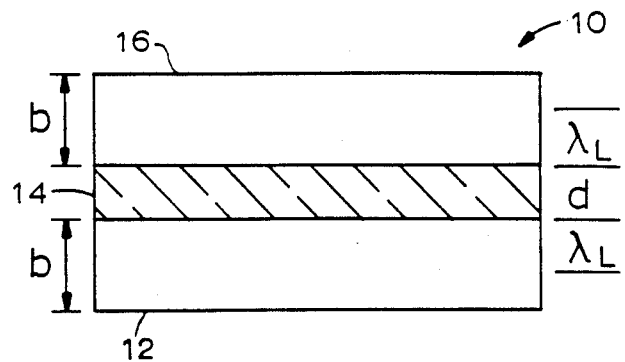
FIG. 1 is a cross-sectional view, not to scale, of a superconducting transmission line having a ground plane, a dielectric layer and a superconducting top electrode.

FIG. 1 illustrates a cross-sectional view of a superconducting transmission line 10. Transmission line 10 is comprised of a ground plane 12 having a magnetic penetration depth $\lambda_L$ and a thickness b, a dielectric layer 14 of thickness d, and a top superconducting electrode 16 having a magnetic penetration depth $\lambda_L$ and a thickness b. Electromagnetic waves propagate along the transmission line with a velocity given by:

$$V_{ph} = (\mu_o \epsilon)^{-\frac{1}{2}} \left[ 1 + 2 \frac{\lambda_L}{d} \coth \frac{b}{\lambda_L} \right]^{-\frac{1}{2}}. \quad (1)$$

For reasonable values of $b \cong \lambda_L$, $d \cong 0.2 \lambda_L$, $\lambda_L = 1400$ angstroms, and the dielectric constant $\epsilon \sim 9$ times that of free space; the group velocity Vg and phase velocity Vph can be shown to be approximately $1 \times 10^9$ cm/sec.

The superconducting electrode 16 is preferably fabricated as a well-coupled high current density polycrystalline or nominally single crystalline film layer. Materials suitable for the fabrication of the electrode 16 include conventional "low temperature" superconductors such as Pb, Nb, NbN, the superconducting compounds having the A-15 crystal structure, $Nb_3(M)$ where M is Sn, Al or Ge, as well as high temperature superconductors including compounds based on compositions containing (Y, Ba, Cu, O), (Bi, Sr, Ca, Cu, 0), (Tl, Ba, Ca, Cu, O) and elemental replacements or substitutions thereof. An appropriate thickness of the electrode is tailored to optimize performance in the desired wavelength range from $10^{-3}$ to $10-6$ centimeters. Appropriate dielectrics include amorphous polycrystalline or crystalline insulators such as silicon dioxide, silicon nitride, aluminum, magnesium, zirconium, rare-earth or niobium oxides or epitaxially grown layers comprised of compounds related to the underlying superconductors. The dielectrics may also be thinned single crystal substrates such as oxides of Mg, Al, strontium titanate, lanthanum gallate, or lanthanum aluminate on which high quality superconductors may be grown. Thicknesses of dielectrics are chosen with respect to desired resonant frequency, dielectric losses and transmission line geometry and may vary in the approximate range between $10^{-2}$ to $10^{-6}$ centimeters. Dielectric thicknesses are comparable to or smaller than the spacing between adjacent folds of the transmission line to reduce crosstalk. Typical widths of the electrode 16 are approximately 0.1 micron to approximately 1000 microns. Typical overall lengths may range from approximately 0.001 cm to approximately 100 cm. The resonant frequency of the line may vary between approximately 0.01 GHz to approximately 1000 GHz.

Figure 2A:
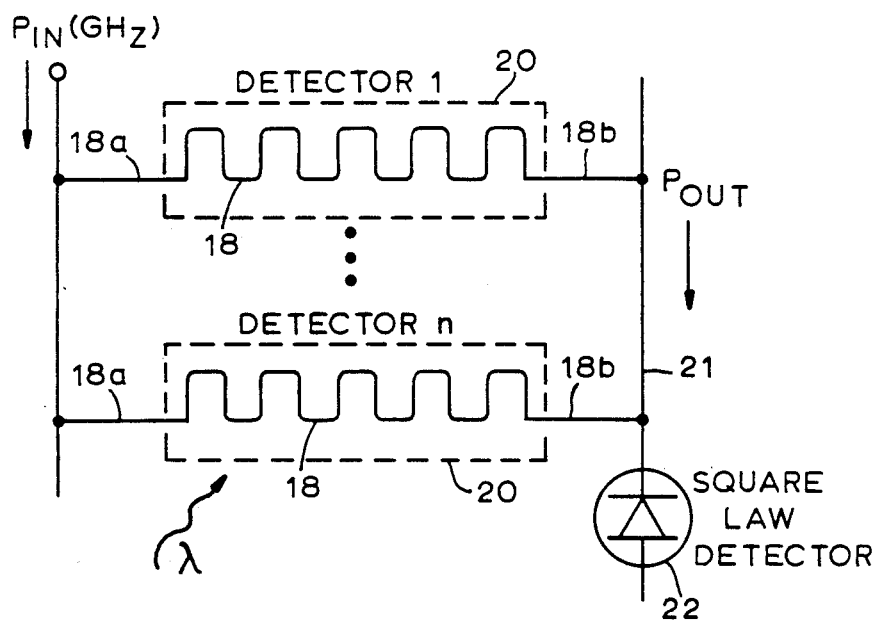
FIG. 2a is a representative top view, not to scale, of a first embodiment of the invention having a plurality of radiation detectors each of which is comprised of a folded superconducting transmission line having an output coupled to a wideband non-resonant transmission line.

In accordance with the invention such a superconducting transmission line, having a preferred topological configuration including two or more ports, is applied to the detection of infrared or visible radiation. An example of a preferred topological configuration is shown in FIG. 2a where the transmission line 18 can be seen to be folded between an input port 18a and an output port 18b. The folded transmission line 18 comprises a radiation detector 20 that resonates at multiples of frequencies inversely proportional to the time for a wave to propagate from one end of the transmission line to the other and back:

$$f_N = NV_{ph}/2L. \quad (2)$$

An on-resonance probe pulse is simultaneously applied to the input ports 18a of the plurality of detectors 18 while the output ports 18b are sequentially coupled to an output transmission line 21 that is coupled to a detector, such as the square law diode detector 22. Power gain is provided by reading out the shift in resonant frequency through attenuation of the probe pulse power ($P_{IN}$). A large change in $P_{OUT}$ is achieved due to the high Q of the resonant transmission line 18.

The radiation absorbing top electrode 16 of the FIRST detector 20 is comprised of a thin film which may be less than 1000 angstroms in thickness and which absorbs substantially all optical quanta within a spectral band of approximately 0.3 micron to approximately 30 microns or more. It has been found that Cooper pair breaking by incident photons results in a change in the kinetic inductance and a consequent shift in the resonance frequency of the superconducting transmission line 18. For a high Q structure such as the transmission line 18 a small shift in resonance results in a large change in the amplitude of the propagated on-resonance probe pulse. Furthermore, a large probe pulse amplitude may be propagated along the superconducting transmission line 18 with minimal loss or power dissipation, thereby reducing the sensitivity requirements for the probe pulse detector(s) 22.

Figure 2B:
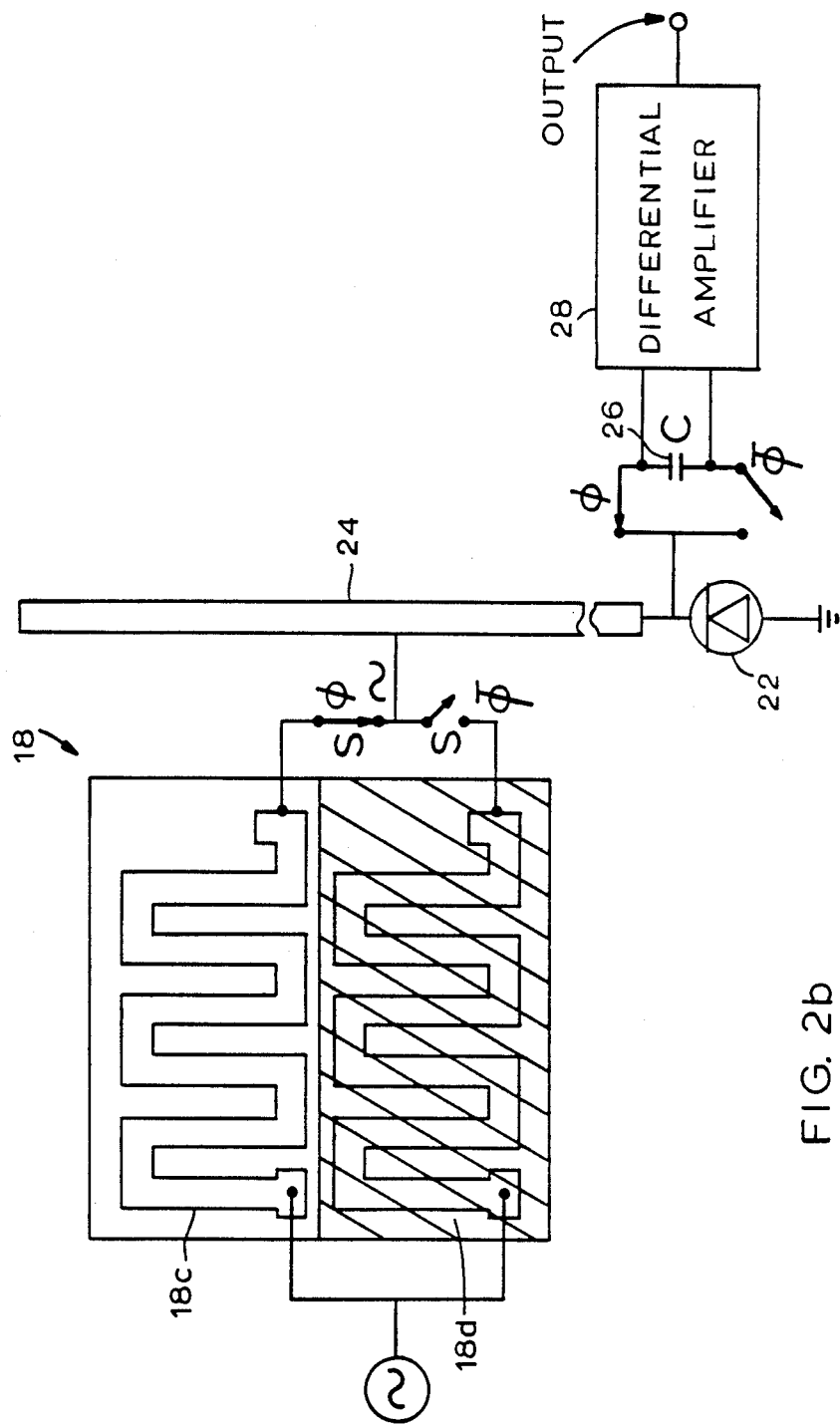
FIG. 2b is a representative top view, not to scale, and a circuit diagram of a second embodiment of the invention having radiation detectors arranged as differential pairs of illuminated and nonilluminated folded superconducting transmission lines.

Referring to FIG. 2b there is shown another embodiment of the invention wherein a detector 18 comprises differential pairs of matched transmission lines 18c and 18d, one line of the pair (18c) being illuminated while the other line (18d) is maintained in a nonilluminated or dark condition. Detectors 18c and 18d are alternatively coupled to a wide bandwidth nonresonant stripline 24 by an associated switch S. Stripline 24 is coupled to a detector 22 and, via a switched capacitor 26, to a differential amplifier 28. Enhanced dynamic range and offset correction are achieved by multiplexing the output from the optically exposed element (18c) and the shielded element (18d) and integrating the difference in transmitted microwave power onto a differential element, such as the switched capacitor 26. The difference signal is amplified utilizing a wideband amplifier 28. Switches S and those coupling to C 26 are shown being alternately energized by timing signals $\phi$ and $\bar{\phi}$. Alternatively the difference between transmitted power from a single element sequentially illuminated and exposed to radiation may be amplified utilizing the same circuitry, with the same effect.

In practice, each of the folded transmission lines 18a-18d is fabricated as a narrow width linear element that overlies the low loss dielectric layer 14 and the bottom electrode ground plane 12. As an example, a one micron width line, when folded such that it densely fills a 100 micron $\times$ 100 micron pixel area, provides an effective length of approximately 0.5 cm. Such a transmission line 18, assuming a typical dielectric constant value, resonates at multiples of approximately 4.0 GHz, a frequency that is compatible with commercially available, high performance microwave Schottky diode detectors. The narrow band transmission line 18 is coupled to the sensor 22 and to the narrow band microwave source by, for example, resistive or capacitive inputs that are integrated with the line 18. A sharp resonance characteristic having a Q value in excess of $10^5$ is achieved. A detector to detector uniformity of one part in $10^5$ is limited primarily by lithographic variations in the length of the folded transmission line 18. In other embodiments the region within which the line is folded may have dimensions of approximately 10 microns by 10 microns to approximately 1000 microns by 1000 microns or greater. Of course the region need not be square in shape.

Figure 3A:
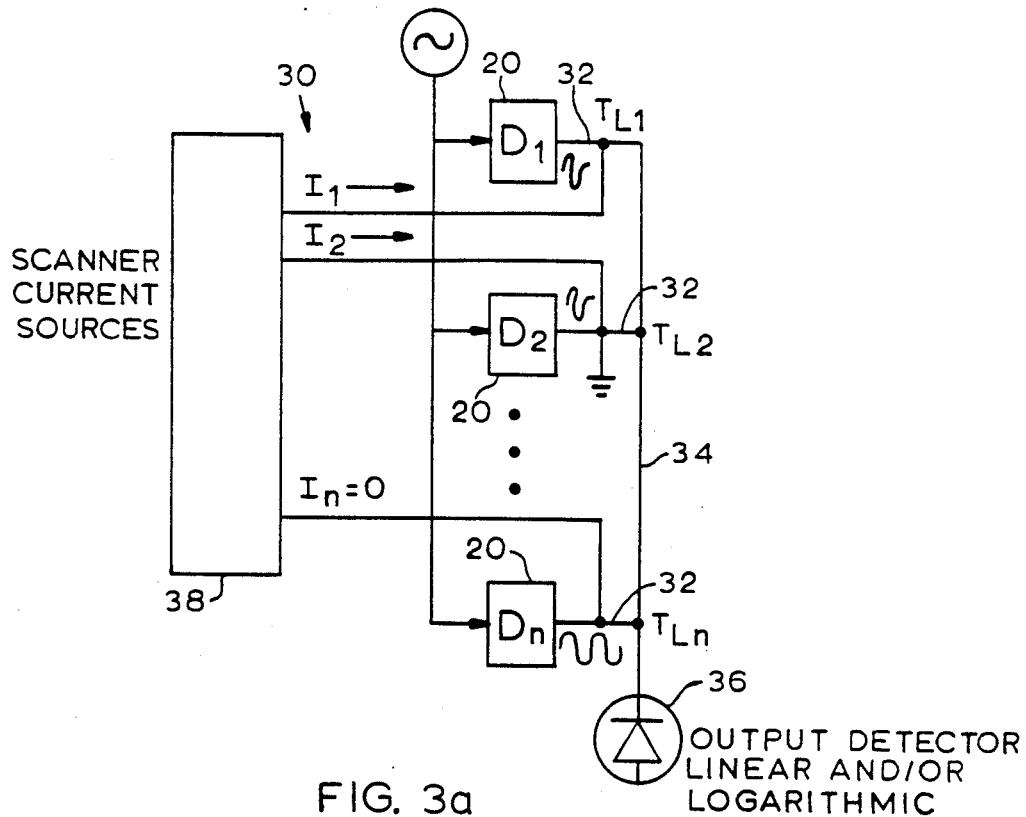
FIG. 3a is a representative top view, not to scale, and a circuit diagram of a third embodiment of the invention having an array of radiation detectors, either single or differential pairs, having outputs multiplexed sequentially onto a wideband transmission line.

Referring to FIG. 3a there is illustrated a readout apparatus 30 that utilizes a plurality of Q-switched transmission lines ($TL_1-TL_n$) 32 each of which couples an associated folded transmission line detector 20 to a common output transmission line 34 and to an output frequency or output power detector 36. The detectors 20 are coupled in common to a microwave source having a frequency substantially equal to the resonant frequency of the detectors 20. A scanned current source 38 has a plurality of current outputs individual ones of which are coupled to one of the Q-switched transmission lines $TL_1-TL_n$ 32. A current either directly injected or magnetically coupled to one of $TL_1-TL_n$ lines 32 changes the line 32 impedance, thereby Q-switching the line 32. This suppresses the transmission line 32 propagation, effectively decoupling the associated detector 20 from the output transmission line 34. For the scanner 38 output which has no current flow ($I_n$) the frequency propagation of the associated transmission line ($TL_n$) is not suppressed and is coupled to the output transmission line 34.

Figure 3B:
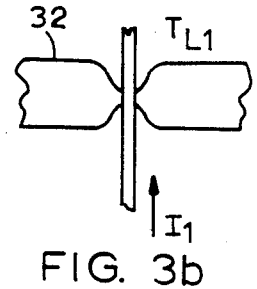
FIG. 3b shows in greater detail a portion of the Q-switched transmission line and its intersection with an output line from a current scanner.

As can be seen in FIG. 3b the Q-switched transmission line 32, for example $TL_1$, is tapered at the point where it intersects the $I_1$ conductor from the scanner 38. The tapered section permits a smooth transition to the higher impedance line. Also the line may be thinned in the dimension perpendicular to the page. Both geometrical constrictions (typically a factor of two to three) reduce the maximum critical current sustainable by the resulting "weak-link" structure. The critical current can be suppressed to zero by the magnetic field or current coupled into the weak-link by the current flowing in the overlying $I_1$ control line. An alternate circuit arrangement (not illustrated) utilizes dielectric or semiconducting layers that separate HTS electrodes, forming a Josephson junction, and thus reducing the maximum critical current without changing the cross sectional area of the line 32. The overlying $I_1$ control line in this case as well suppresses the critical current to zero. Resultant "normal state" resistivity drastically attenuates microwave propagation in the transmission line 32.

The operation of one of the FIRST detectors will now be described. Upon optical irradiation of the FIRST detector 20 superconducting paired electrons, or Cooper pairs, are broken thereby creating excess normal state quasiparticles. This reduction in electron pairs participating in the superconducting ground state reduces the critical current density that can screen magnetic fields thereby increasing the screening or magnetic penetration depth, $\lambda_L$. The penetration depth is proportional to the inverse square root of the number of electron pairs and can be expressed as:

$$\lambda_L = \lambda_{Lo}(1-(n_{qp}/2n_s)),\quad (3)$$

where $n_{qp}$ is the quasiparticle density and $n_s$ is the electron pair density.

The number of broken electron pairs induced in the upper electrode 16 is proportional to the photon flux, yield per photon (r) and quasiparticle lifetime ($\tau$) and is inversely proportional to the thickness (b) as given by the expression $$n_{qp} = (r(Flux)\tau)/b. \quad (4)$$

Assuming a flux of $10^{11}/cm^2$, a per photon yield of six quasiparticles for each 10 micron photon, a lifetime of one millisecond and b=400 angstroms a quasiparticle density of $1.5\times10^{14}/cm^3$ is obtained.

Figure 4:
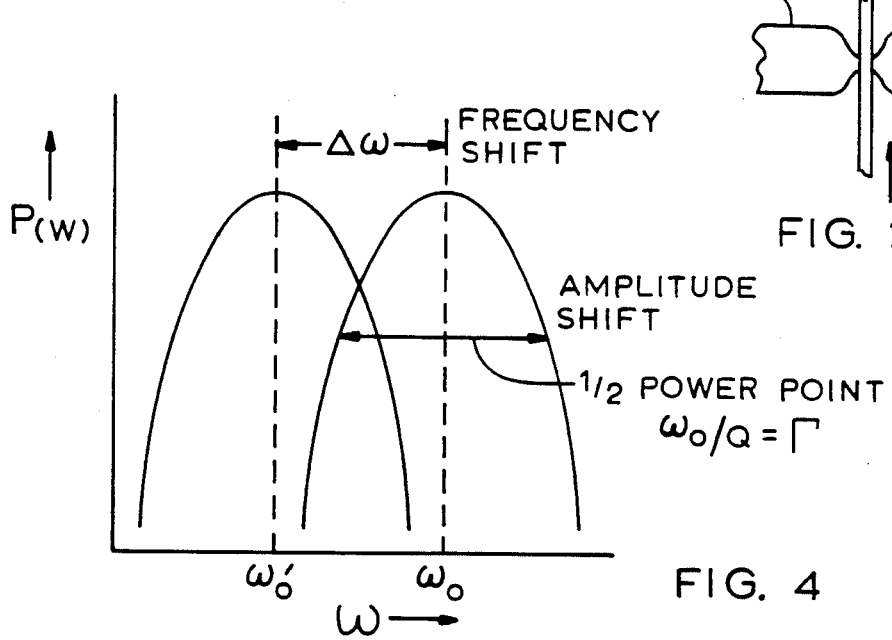
FIG. 4 is a graph that illustrates resonant transmission line characteristics, specifically a frequency and an amplitude shift as a function of illumination.

The steady state density of superconducting pairs is given approximately by $$n_s = N(o)E_g, \quad (5)$$

where N(o) is the single spin density of states and $E_g$ is the superconducting energy gap. For a density of states of $10^{20}$ and an energy gap of 16 meV there is obtained a change in penetration depth and, hence, resonant frequency of approximately 1 part in $10^4$ ($\Delta f/f = n_{qp}/n_s$). This change in resonant frequency due to illumination corresponds to a resonant frequency shift of approximately 0.4 MHz. As shown in FIG. 4 this change in resonant frequency also results in a corresponding attenuation of the narrow band microwave source which propagates through the resonant transmission line 18 by more than a factor of five. In FIG. 4 the term $P(\omega)$ is given by the expression $$P(\omega) \propto 1/((\omega-\omega_o)^2 + (\omega_o/2Q)^2). \quad (6)$$

Presently available low noise Schottky diodes operated as linear power monitors extend the lower limit of amplitude shift detection to below $10^8$ photons/cm$^2$ whereas when operated in a logarithmic mode low noise Schottky diodes permit a maximum detection range of $10^{16}$ photons/cm$^2$ or greater. The higher the signal level the lower the detected power. Heterodyne detectors can be utilized at picowatts of power. Alternate heterojunction detectors implemented in II-VI or III-V semiconductors, or superconducting power detectors, may extend dynamic range with a lower noise floor and, hence, a lower detectable signal. Frequency variable sources can further extend the high level range by scanning to the shifted resonant frequency. The extent of scan is associated with a peak in the transmission for a particular detector element.

Figure 5:
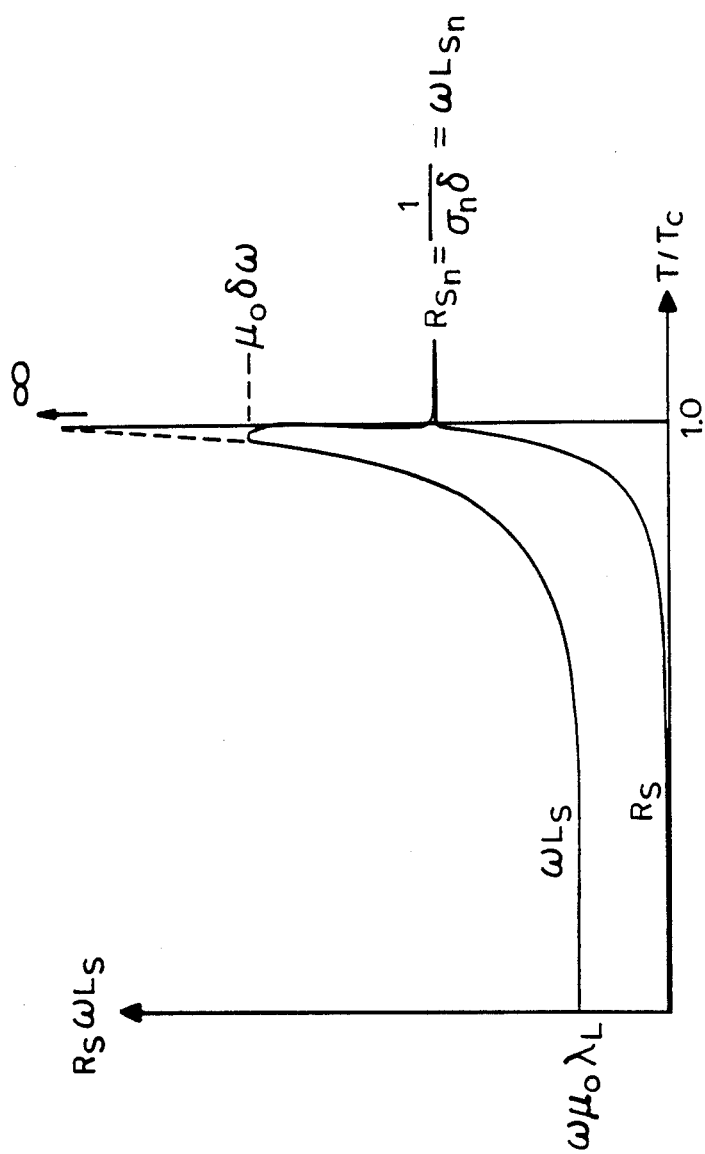
FIG. 5 is a graph which illustrates the temperature dependence of the resistive ($R_s$) and inductive ($\omega L_s$) components of the surface impedance of a superconductor.

The temperature dependence of the resistive ($R_s$) and inductive ($\omega L_s$) components of the surface impedance of a superconductor is shown in FIG. 5. As can be seen convergence of the reactive component, or inductance, rapidly approaches an equilibrium value at approximately 70% of the critical temperature. Thus, operation of the FIRST detector of the invention is achieved at up to approximately 70 to 80% of critical temperature. For 100K HTS material this beneficially corresponds to operation at liquid nitrogen temperature.

As has been shown the frequency domain infrared superconducting detector of the invention provides a unique thin film alternative to both semiconductor and emerging voltage modulation HTS detectors that are based on weak link devices. In contrast to other types of superconducting detectors FIRST detectors do not require weak links and can be fabricated from well-coupled high current density polycrystalline or nominally single crystalline films.

The FIRST detector is comprised of a folded superconducting transmission line coupled at an input port to a narrow band microwave source and coupled at an output port to a microwave power monitor. Optically induced changes in the kinetic inductance of the transmission line shift the transmission line phase velocity and hence its resonant frequency. This shift in resonant frequency attenuates the propagating wave amplitude proportionally to the product of the Q and the frequency shift. Fabricated with a densely folded one micron width line and operating at a nominal resonant frequency of, for example, 4 GHz the use of both linear and logarithmic detectors enables a realization of a dynamic range of eight orders of magnitude. That is, a combined signal plus background range of from $10^8$ to $10^{16}$ photons/cm$^2$ is achieved.

While the invention has been particularly shown and described with respect to preferred embodiments thereof, it will be understood by those skilled in the art that changes in form and details may be made therein without departing from the scope and spirit of the invention. As such, the invention is intended to be limited only as it is set forth in the claims that follow.

What is claimed is:

1. A radiation detector comprising a superconducting transmission line means having an input port for coupling to a frequency signal and an output port for coupling to sensor means for detecting a variation in the frequency signal, said transmission line means being responsive to incident radiation for having induced therein a change in a resonant frequency of said transmission line means.

2. A detector as set forth in claim 1 wherein said superconducting transmission line means comprises a radiation absorbing electrode comprised of a layer of superconducting material, said radiation absorbing electrode being separated from a ground plane electrode by an intervening dielectric layer.

3. A detector as set forth in claim 2 wherein said radiation absorbing electrode has a substantially linear shape, the radiation absorbing electrode being repetitively folded within a region.

4. A detector as set forth in claim 3 wherein said radiation absorbing electrode has a width of approximately 0.1 micron to approximately 1000 microns.

5. A detector as set forth in claim 3 wherein the region has linear dimensions within a range of approximately 10 microns by 10 microns to approximately 1000 microns by 1000 microns.

6. A detector as set forth in claim 3 wherein said radiation absorbing electrode has a length of approximately 0.001 cm to approximately 100 cm.

7. A detector as set forth in claim 3 wherein the resonant frequency of said transmission line means is approximately 0.01 GHz to approximately 1000 GHz.

8. A detector as set forth in claim 1 wherein said detector is responsive to radiation within a wavelength range of approximately 0.3 microns to approximately 30.0 microns.

9. A detector as set forth in claim 2 wherein said radiation absorbing electrode is comprised of a high current density polycrystalline or a nominally single crystalline film layer.

10. A detector as set forth in claim 2 wherein said radiation absorbing electrode is comprised of Pb, Nb, NbN, superconducting compounds having an A-15 crystal structure, Nb$_3$(M) where M is Sn, Al or Ge, or compounds based on compositions containing (Y, Ba, Cu, O), (Bi, Sr, Ca, Cu, O), (Tl, Ba, Ca, Cu, O) and elemental replacements or substitutions thereof.

11. A detector as set forth in claim 2 wherein said dielectric layer is comprised of an amorphous polycrystalline insulator, a crystalline insulator, or a thinned single crystal superconductor substrate material.

12. A detector as set forth in claim 2 wherein said dielectric layer is comprised of silicon dioxide, silicon nitride, aluminum, magnesium, zirconium, rare-earth or niobium oxides, epitaxially grown layers comprised of compounds related to adjacent superconducting material, oxides of Mg, Al, strontium titanate, lanthanum gallate, lanthanum aluminate or combinations thereof.

13. A frequency domain infrared detector system comprising a plurality of radiation detectors, each of said detectors comprising at least one superconducting transmission line means having an input port for coupling to a frequency source and an output port for coupling to an output transmission line means coupled to frequency sensor means, said superconducting transmission line means being responsive to incident radiation for having induced therein a change in a resonant frequency of said superconducting transmission line means, said system further comprising scanner means having a plurality of output signal lines individual ones of which are coupled to an associated switching means for selectively enabling or disabling the coupling of one of the output ports to said output transmission line means.

14. A frequency domain infrared detector system as set forth in claim 13 wherein said superconducting transmission line means has a substantially linear shape having a width within a range of approximately 0.1 micron to approximately 1000 microns, said superconducting transmission line means being repetitively folded within a region and having a total length within a range of approximately 0.001 cm to approximately 100 cm and a resonant frequency within a range of approximately 0.01 GHz cm to approximate 1000 GHz, said superconducting transmission line means being responsive to radiation having wavelengths within a range of approximately 0.3 microns to approximately 30.0 microns.

15. A frequency domain infrared detector system as set forth in claim 13 wherein said frequency source provides a frequency output substantially equal to the resonant frequency of each of said superconducting transmission line means and wherein said frequency sensor means comprises a linear power monitor.

16. A frequency domain infrared detector system as set forth in claim 13 wherein said frequency source provides a frequency output substantially equal to the resonant frequency of each of said superconducting transmission line means and wherein said frequency sensor means comprises a logarithmic power monitor.

17. A frequency domain infrared detector system as set forth in claim 13 wherein each of said radiation detectors comprises a first, illuminated, superconducting transmission line means and a second, nonilluminated, superconducting transmission line means.

18. A frequency domain infrared detector system as set forth in claim 13 wherein said scanner means generates a current flow on one of said output signal lines for disabling the coupling of an associated output port to said output transmission line means.

19. A frequency domain infrared detector system as set forth in claim 13 wherein each of the output ports comprises a length of superconducting transmission line and wherein said switching means comprises a weak link structure comprised of a tapered portion of said transmission line and an intersecting control line, said control line comprising the output signal line from said scanner means.

20. A frequency domain infrared detector system as set forth in claim 13 wherein said switching means comprises a Josephson junction structure.

21. A frequency domain infrared detector system comprising a plurality of radiation detectors, each of said detectors comprising at least one superconducting transmission line means having an input port for coupling to a microwave frequency source and an output port for coupling to an output transmission line means coupled to frequency sensor means, said superconducting transmission line means having a substantially linear shape having a width of approximately 0.1 micron to approximately 1000 microns and a resonant frequency of approximately 0.01 GHz to approximately 1000 GHz, said superconducting transmission line means being repetitively folded within an area, said superconducting transmission line means being responsive to incident radiation for absorbing radiation within a predetermined spectral band, the absorbed radiation inducing a change in a resonant frequency of said superconducting transmission line means, said system further comprising scanner means having a plurality of output signal lines individual ones of which are coupled to one of said output ports for selectively providing a current to said output ports for disabling the coupling of said output ports to said output transmission line means.

22. A system as set forth in claim 21 wherein said superconducting transmission line means is comprised of high temperature superconducting material.

23. A system as set forth in claim 21 wherein said predetermined spectral band is approximately 0.3 microns to approximately 30.0 microns.

24. A system as set forth in claim 21 wherein said microwave frequency source provides a frequency output substantially equal to the resonant frequency of each of said superconducting transmission line means and wherein said frequency sensor means comprises a Schottky barrier detector.

* * * * *